March 22, 1966     W. KOBER     3,242,363
ALTERNATING CURRENT GENERATOR
Filed Nov. 16, 1962     4 Sheets-Sheet 1

INVENTOR.
William Kober,
BY
Christel + Bean
ATTORNEYS.

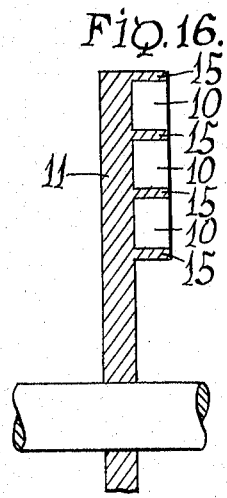
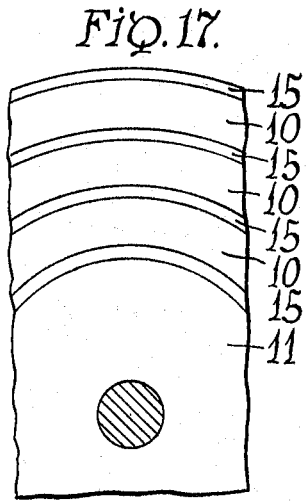
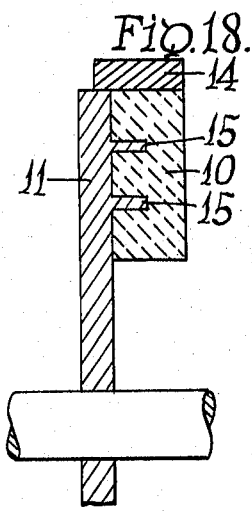
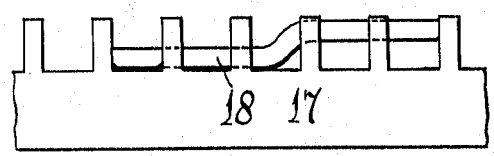
Fig.3.
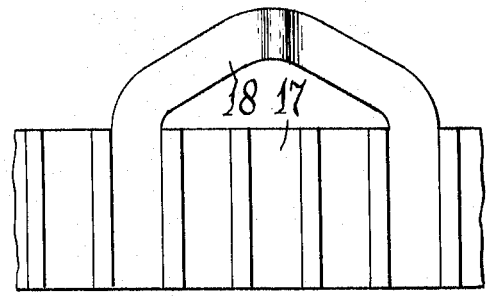
Fig.4.

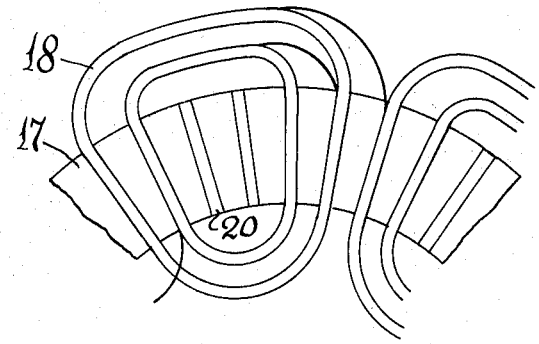
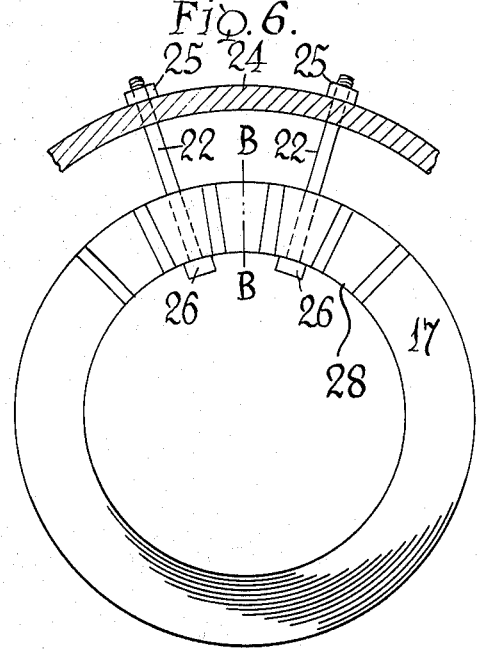
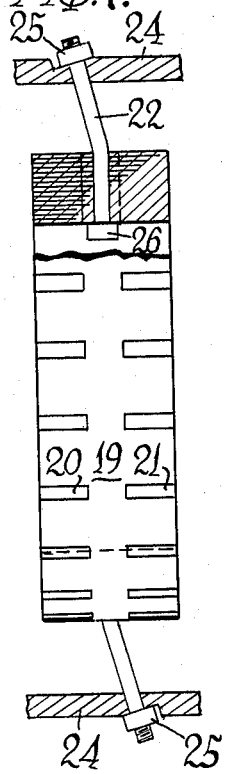

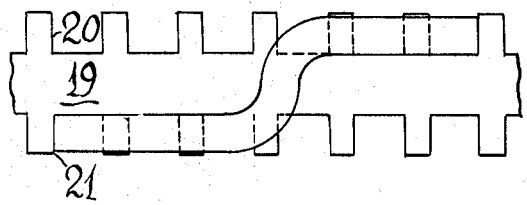
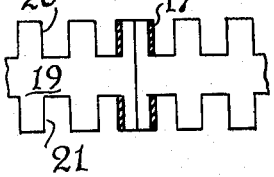
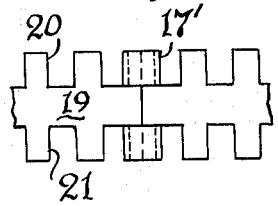
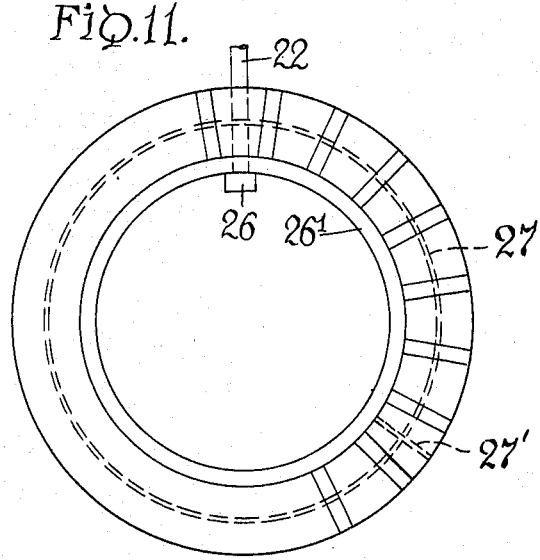
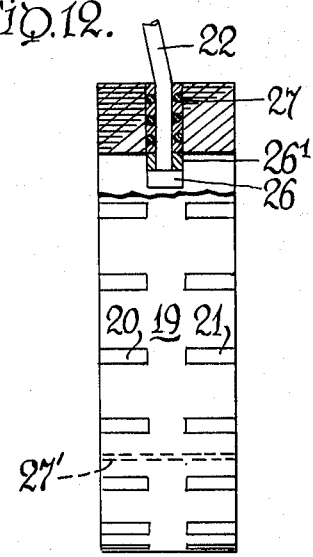

United States Patent Office 3,242,363
Patented Mar. 22, 1966

3,242,363
ALTERNATING CURRENT GENERATOR
William Kober, Fairport, N.Y., assignor, by mesne assignments, to The Garrett Corporation, Los Angeles, Calif., a corporation of California
Filed Nov. 16, 1962, Ser. No. 238,250
2 Claims. (Cl. 310—258)

This invention relates generally to the electrical art, and more specifically to a new and useful alternating current generator. This application is a continuation-in-part of my abandoned application Serial Number 770,029, filed October 28, 1958.

In the drawings, which are essentially diagrammatic, like reference numerals denote like parts throughout and:

FIGS. 3 and 4 are elevational and top plan views, respectively, of a polyphase armature winding of the invention;

FIG. 5 is a plan view of a single phase armature winding;

FIGS. 6 and 7 are elevational and longitudinal sectional views, respectively, of an armature construction, with the windings removed for ease of illustration;

FIG. 8 is an elevation of a polyphase winding for a split armature;

FIG. 9 is a detail view illustrating in section the joining on a split stator;

FIG. 10 is a detail view, like FIG. 9, but with the joining sleeves in elevation; and FIGS. 11 and 12 are elevational and longitudinal sectional views, respectively, of a modified armature construction, with the armature windings removed for ease of illustration;

FIG. 16 is a fragmentary longitudinal sectional view of an alternate permanent magnet field structure of my invention;

FIG. 17 is a fragmentary end elevational view of the field structure of FIG. 16; and FIG. 18 is a view similar to FIG. 16, but showing a modification.

Figure 1:
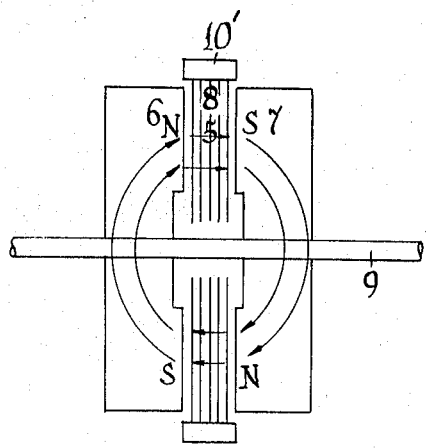
FIG. 1 is a longitudinal sectional view of the basic alternator construction of my invention.
Figure 2:
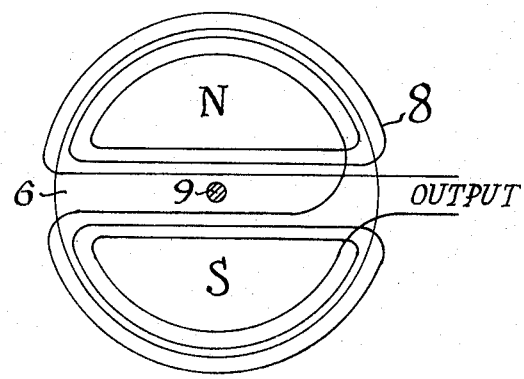
FIG. 2 is an end elevational view of a field producing structure and the armature winding of FIG. 1.

FIGS. 1 and 2 show the basic arrangement of this invention. It takes the form of an axial air gap dynamo, but there is no stator iron at all. The two field producing structures 6 and 7 face each other across air gap 5 which need only be the relatively short distance required to accommodate winding 8. The armature winding 8 obtains no support from stator iron and so requires other methods of support, one supporting structure being indicated by the frame 10'. The winding 8 may or may not contain stator type teeth.

The advantages of this basic construction, and details of examples of suitable field producing structures 6 and 7, and various armature windings 8, are fully set forth in my pending applications Serial No. 770,029, now abandoned, filed October 28, 1958 and Serial No. 192,122, filed May 3, 1962, to which reference is hereby made for any such details.

The subject of the polyphase winding for the generators of the invention can best be opened by considering the winding of an axial air gap stator. The pattern here is fundamentally that of the cylindrical conventional machine, with two coil sides per slot, and hooked for the cross-over. Each coil has one side in the bottom of one slot, and the other side in the top of the next. The pattern is indicated in FIGS. 3 and 4, showing one end of one coil 18 in a stator 17, which for simplicity has no curve as in a cylindrical air gap machine, and no convergence as in an axial air gap machine. In this case, the cylindrical and axial coil patterns are identical, and it is obvious how the pattern will work out in the special case of the axial air gap type. The axial type coil looks different because of its non-parallel slot parts, and the longer end conductors on the outside as compared to the inside, but works on the same basic principle. The outside end conductors are also often pushed back after winding, to make the diameter smaller.

A single phase winding for an axial air gap stator is shown in FIG. 5. In this form, crossovers are avoided by placing the smallest coil inside, and the successively larger ones outside, with only the connection between coils going outside a plane. This pattern is also familiar, and requires no further explanation.

In the generator of the invention, the winding arrangements are somewhat different when teeth of permeable material are used, compared to the case where no permeable material exists in the air gap. The case where teeth are used is more like the axial windings just discussed. One form is shown in FIGS. 6 and 7. Stator 17 is wound like a roll of tape, and teeth 20 are cut in to one side. So far, the treatment is exactly like that of my Patent 2,719,931. Slots 21 are also cut in the other side, preferably in line with slots 20. Some material 19 is left between slots, to form a mechanical band producing strength and rigidity in the stator, which would otherwise become a series of separated wedge-shaped pieces. Tie-rods 22, with heads 26, are passed through radial holes in the band 19, and are fastened circumferentially to ring 24, which is attached to the frame of the generator, not shown, which also supports the bearings (not shown) of the rotating field system. The tie-rods are shown staggered, alternately left and right and are in considerable tension produced by the nuts 25 or some equivalent tensing device. The staggering is optional, but is usually helpful in greatly increasing the resistance of the stator to endwise motion. Unbalanced magnetic forces exist to some extent, causing a tendency to lateral motion, and it is naturally undesirable to jeopardize the air gap clearance between the rotor faces and the stator. The rigidity produced by the staggered tie-rods is similar in kind to that produced both rotationally and laterally in wire wheels.

The slots 20 are provided with a winding of the normal axial type, as shown in FIGS. 3 and 4 for polyphase, and FIG. 5 for single phase. Slots 21 have a similar winding, which may be connected in series or parallel with that of slots 20. For a two phase machine, a single phase winding in slots 20 may be one phase, and a single phase winding in slots 21 displaced 90 electrical degrees may be the other phase. Such a two phase winding may also be connected to produce a three phase output by using Scott-connection taps in the windings of slots 20 and of slots 21.

It is possible to split the stator ring in one place B—B of FIG. 6, or in two places 180° apart. Refastening can be secured by a dovetail (not shown) or by cutting in the center of a tooth and placing a non-conducting ring 17' over the tooth halves on each side, as shown in FIG. 9. The magnetic circuit exists only across the stator, from side 20 to side 21, and a magnetic break circumferentially makes no difference. Another convenient method of refastening a split stator is to use a ring 26' between the inner diameter of the stator 17 and tie-rods heads 26, as shown in FIGS. 11 and 12. This ring may be split also in one or two places, which should be in between the split places of the stator. The tie-rods then act in shear to hold the stator and ring in one rigid unit. When the stator is split, it is possible to modify the polyphase winding by placing one coil side of each coil in slots 20, and the other in 21, as shown in FIG. 8. When this is done, care must be taken to avoid the tie-rods 22 with the winding ends. This is readily done by putting an insulating sleeve on the tie-rods and deforming the coils slightly. This type of winding may also be placed on an unsplit stator by winding the coils in place, which is convenient in some machines with a simple winding pattern. The coil ends are disposed more neatly in this type of winding, where a coil crosses from side 20 to side 21.

The conditions arising in the generator according to this invention also permit use of iron dust or powder cores, cemented into shape and having the slots molded or cut into this material. Such dust material has very low magnetic losses, particularly at high frequencies, and permeabilities that are high enough to be useful in machines where the MMF is too low to permit an all-air or coreless winding. The short path through the teeth, which is a unique feature of the generators of the invention, makes a moderate permeability useful, where it would be out of the question in the long path necessary in conventional types. When dust tooth construction is used, it is advisable to install or mold in one or more supporting rings in the region 19 of FIG. 7. Circumferential steel wires 27, FIG. 11, solid or stranded, may also be molded into place in the region 19 to supply circumferential tensile strength to the molded composite structure, in a way similar to wires used in V belts and tire beads. A reinforcement of steel wires, either singly or in separate or braided groups, or even steel sheet, may be placed lengthwise of the teeth in the molding operation to reinforce them, as indicated at 27'.

Winding with the dust tooth is similar to that for the rolled steel sheet, and so is mounting in place between the field parts. Tooth iron as described, is used in small machines, or generally when the field MMF between poles is not great enough to get a sufficient density in the air gap for the desired design purpose. The tooth iron otherwise not beneficial, as it has magnetic losses, requires slot insulation (even with dust types), and must be more strongly mounted as it is subject to considerable mechanical force to the interaction of the field and the tooth iron. The tooth iron also reduces the available space for the winding conductors, and in turn the conductor space and the saturation limit of the teeth put a maximum on the working flux. The permeability of the tooth material also increases slot reactance, and through this, total reactance, and reactance increase is usually harmful to performance.

Thus, in many cases, it is preferable to use no permeable material at all in the air gap. Some winding patterns are of the type of FIGS. 3, 4 and 8. In this case, the iron of FIG. 6 becomes non-conducting material such as ceramic, glass, plastic, etc. Since the teeth carry no more flux than the slots, the minimum tooth width shown at 28, FIG. 6, can be made quite small, accommodating more slot space. Also, since the frame is an insulator, no slot insulation will be required for the winding. All the winding patterns previously described apply. As noted above, the force in the stator is much reduced, being only the force between current in the winding and the field, which has very little lateral component. Thus, the clearance gap between the field pole faces and the winding is readily maintained. The principal force on the winding is one of rotation with the fields, and its amount is closely equal to the mechanical torque of the driving power applied to the generator shaft. Thus, tie-rods 22 may be staggered at angles to a radial line, rather than laterally, as shown in FIGS. 6 and 7. In case vibration or accelerational forces also exist, they may be staggered in both ways, giving stability in all directions for the stator support.

Figure 13:
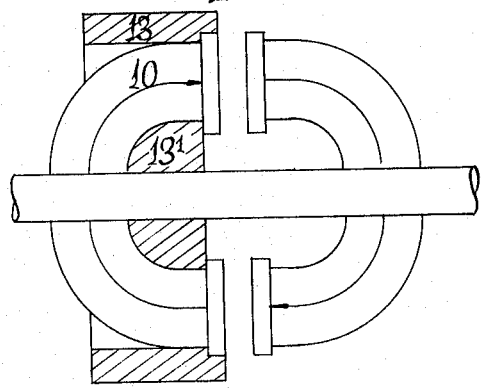
FIG. 13 is a view, partly in elevation and partly in longitudinal section of a permanent magnet field structure of my invention.
Figure 14:
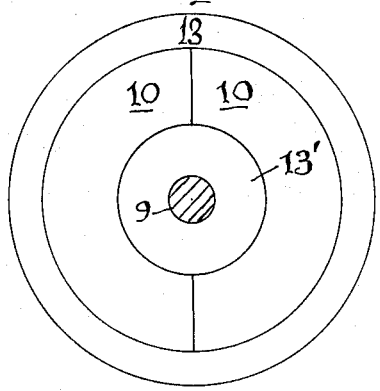
FIGS. 14 and 15 are rear and front elevational views, respectively, of the field structure of FIG. 13.
Figure 15:
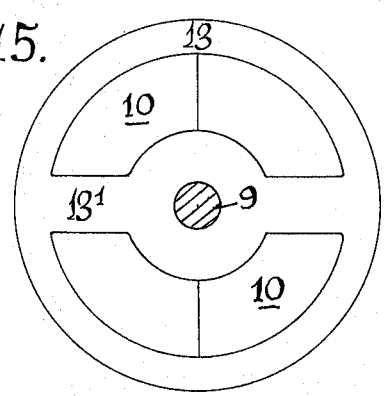

The flux return iron in the field structures is to some degree not fully active, since it acts merely to transport flux, and not to augment the magnetic energy of the magnets. A construction such as shown in FIGS. 13, 14 and 15 has the entire magnetic circuit made of permanent magnet material, and so has an increased utilization of weight. The part 13 acts to hold the magnets in position and support them against the large centrifugal force at higher speeds. Each field structure has a pair of magnet bodies 10, each having a north pole at one end and a south pole at the other, the norths and souths being paired. The outer periphery of the magnets rests on the inside of the ring forced on the outside of the material 13, and the part 13' also gives strength as a bar. Part 13 and 13' also form a magnet protecting electrically conducting path. This type of construction is also adaptable to multi-pole field structures. For the present invention, this structure is particularly advantageous because it develops high magnet lengths and MMF's, and so helps to produce a machine with most favorable characteristics according to the invention.

Of special interest in certain generator problems is the use of high-coercive low density magnet materials, such as "dust" and "ceramic" compositions. Many of these materials have such characteristics as to be stable in magnetic performance even under short-circuit conditions of the generator they are in. Relatively short lengths are sufficient to produce a MMF in the air gap capable of developing an optimum winding and magnet performance. Such a consideration, illustrated in FIGS. 16–18, favors the magnetic return circuit 11 shown, since enough length is readily developed in the thickness of the annular magnet 10, and the density in the magnet is so low as to make transmission by the high density magnetic circuit element 11 economical of weight. Such a magnet structure is readily made up by compacting the material against the steel or iron plate 11 during manufacture in a continuous ring. Any desired number of poles may be formed in the process of magnetization, the material at the dividing point between N and S poles producing flux in a circumferential direction, and so being of use. Ring 14 (FIG. 18) may be added, of non-magnetic strong material, to help support material 10 against centrifugal force in cases where this becomes large. Where a magnet protecting shield is required, ring 14 is electrically conductive.

FIGS. 16 and 17 show another method of supporting material 10 against centrifugal force, by providing rings 15 which may be part of plate 11 or merely separate rings laid upon it during the compacting process of applying permanent magnet material 10. When rings 15 are of permeable material, adjacent permanent magnet material 10 will develop flux into these members, and so is not inoperative. Rings 15 may also be non-magnetic, and may be formed as a mechanical part of the magnet, later assembled to plate 11. In many cases, the magnet does not need support, and rings 15 may be omitted.

FIG. 18 shows a slight modification, where rings 15 do not reach the surface of material 10, and where an outer non-magnetic ring 14 is provided. The rings 15 of FIG. 18 may be either part of 11, and permeable, or separate rings and then preferably non-permeable. FIG. 18 permits a higher face flux density because no face area is lost, and has nearly as much supporting strength as FIG. 16. The presence of permeable material 15 near the winding in the air gap also poses some minor disadvantages in generator performance, and should be avoided in high performance designs.

When the magnet material of FIGS. 16–18 type requires magnetic shielding as many high-coercive materials do, the final physical form becomes quite similar to the arrangement of FIG. 3 of my pending application Serial No. 192,122. The only difference is in the process of formation, since magnet material 10 is conveniently formed attached to part 11, and the conducting and mechanical supporting part is then placed over magnets 10 and into the interpole recesses which are then provided for it. It is also possible to place parts 11 and 13 in proper relation, and then form material 10 into place.

Having fully disclosed my invention, and described its mode of operation, what I claim as new is:

1. A dynamoelectric machine comprising rotatable field producing structures having opposed proximate poles, means mounting said structures for rotation about an axis, an annular stator positioned in the air gap between said field structures, said stator having teeth on opposite sides thereof, and an armature winding in the slots between said teeth, together with stator support means comprising tie-rods extending outwardly from said stator.

2. A dynamoelectric machine comprising rotatable field producing structures having opposed proximate poles, means mounting said structures for rotation about an axis, an annular stator positioned in the air gap between said field structures, said stator having teeth on opposite sides thereof, and an armature winding in the slots between said teeth, together with stator support means comprising tie-rods extending outwardly from said stator, wherein said tie-rods are connected to said stator at spaced points therearound, said tie-rods being staggered in opposite axial directions around said stator.

References Cited by the Examiner

UNITED STATES PATENTS

| 302,319 | 7/1884 | Brush | 310—268 |
| 2,773,306 | 12/1956 | Ranson | 30—43 |
| 2,873,395 | 2/1959 | Kober | 310—112 |

FOREIGN PATENTS 322,829  12/1929  Great Britain.

ORIS L. RADER, *Primary Examiner.*

MILTON O. HIRSHFIELD, *Examiner.*